(12) United States Patent
Nam

(10) Patent No.: US 12,036,969 B2
(45) Date of Patent: Jul. 16, 2024

(54) ELECTRIC PARKING BRAKE SYSTEM AND CONTROL METHOD THEREFOR

(71) Applicant: HL MANDO CORPORATION, Pyeongtaek (KR)

(72) Inventor: Gungjin Nam, Seoul (KR)

(73) Assignee: HL MANDO CORPORATION, Pyeongtaek (KR)

( * ) Notice: Subject to any disclaimer, the term of this patent is extended or adjusted under 35 U.S.C. 154(b) by 0 days.

(21) Appl. No.: 17/766,259

(22) PCT Filed: Sep. 28, 2020

(86) PCT No.: PCT/KR2020/013201
§ 371 (c)(1),
(2) Date: Apr. 4, 2022

(87) PCT Pub. No.: WO2021/075763
PCT Pub. Date: Apr. 22, 2021

(65) Prior Publication Data
US 2024/0051506 A1   Feb. 15, 2024

(30) Foreign Application Priority Data
Oct. 15, 2019   (KR) .................. 10-2019-0128031

(51) Int. Cl.
*B60T 8/171*   (2006.01)
*B60T 8/172*   (2006.01)
(Continued)

(52) U.S. Cl.
CPC .............. *B60T 8/172* (2013.01); *B60T 8/171* (2013.01); *B60T 8/18* (2013.01); *B60T 8/245* (2013.01);
(Continued)

(58) Field of Classification Search
CPC . B60T 8/171; B60T 8/172; B60T 8/18; B60T 8/24; B60T 8/245; B60T 8/26;
(Continued)

(56) References Cited

U.S. PATENT DOCUMENTS 5,962,997 A    10/1999  Maisch
6,422,663 B1   7/2002   Siepker
(Continued)

FOREIGN PATENT DOCUMENTS

CN    201371806 Y    12/2009
CN    102815296 A    12/2012
(Continued)

OTHER PUBLICATIONS

First Office Action issued on Sep. 1, 2023 for counterpart Chinese Patent Application No. 202080071667.4.

*Primary Examiner* — Erick R Solis
(74) *Attorney, Agent, or Firm* — Harvest IP Law, LLP

(57) ABSTRACT

An electric parking brake system according to one embodiment comprises: a first electric parking brake provided at a front wheel of a vehicle so as to generate a first clamping force; a second electric parking brake provided at a rear wheel of the vehicle so as to generate a second clamping force; an inclination sensor for detecting the inclination degree of the vehicle; and a control unit for determining the total clamping force required for parking on the basis of the inclination degree of the vehicle and vehicle weight information, determining the electric parking brake, to be operated, from among the electric parking brakes according to the determined total clamping force, and operating the determined electric parking brake.

13 Claims, 9 Drawing Sheets

(51) Int. Cl.
  *B60T 8/18* (2006.01)
  *B60T 8/24* (2006.01)
  *B60T 8/26* (2006.01)
  *B60T 8/30* (2006.01)
  *B60T 8/40* (2006.01)
  *B60T 13/74* (2006.01)

(52) U.S. Cl.
  CPC *B60T 8/26* (2013.01); *B60T 8/30* (2013.01); *B60T 8/4022* (2013.01); *B60T 13/746* (2013.01); *B60T 2210/20* (2013.01); *B60T 2250/02* (2013.01)

(58) Field of Classification Search
  CPC .......... B60T 8/266; B60T 8/30; B60T 8/4022; B60T 13/74; B60T 13/741; B60T 13/746; B60T 2210/20; B60T 2250/02
  USPC ......................................... 701/70, 78, 80, 81
  See application file for complete search history.

(56) References Cited

U.S. PATENT DOCUMENTS

| | | | |
|---|---|---|---|
| 10,766,469 B2* | 9/2020 | Takae | B60T 8/17616 |
| 10,988,121 B2* | 4/2021 | Burt | B60W 30/18118 |
| 2010/0211281 A1 | 8/2010 | Baier-Welt | |
| 2015/0217739 A1 | 8/2015 | Blattert | |
| 2016/0109024 A1* | 4/2016 | Capito | F16H 63/486 701/69 |
| 2018/0148028 A1* | 5/2018 | Baehrle-Miller | B60T 13/588 |
| 2018/0154875 A1* | 6/2018 | Takahashi | B60L 7/18 |
| 2018/0208170 A1 | 7/2018 | Hanzawa | |
| 2023/0042441 A1* | 2/2023 | Fujita | B60T 13/741 |

FOREIGN PATENT DOCUMENTS

| | | |
|---|---|---|
| CN | 105523022 A | 4/2016 |
| CN | 106627534 A | 5/2017 |
| DE | 102017204765 A1 | 10/2018 |
| JP | 2001063537 A | 3/2001 |
| JP | 2005343194 A | 12/2005 |
| JP | 2006015790 A | 1/2006 |
| JP | 2006219133 A | 8/2006 |
| JP | 2013132935 A | 7/2013 |
| KR | 20000019246 A | 4/2000 |
| KR | 20120052562 A | 5/2012 |

* cited by examiner

ELECTRIC PARKING BRAKE SYSTEM AND CONTROL METHOD THEREFOR

CROSS REFERENCE TO RELATED APPLICATIONS

This application is a National Stage of International Application No. PCT/KR2020/013201 filed Sep. 28, 2020, claiming priority based on Korean Patent Application No. 10-2019-0128031 filed Oct. 15, 2019, the disclosure of which is incorporated herein by reference in its entirety.

TECHNICAL FIELD

The disclosed invention relates to an electronic parking brake system and a method for controlling the same and, more specifically, to a motor-on-caliper (MoC)-type electronic parking brake system that operates with a motor integrated with a caliper mounted on the wheel, and a method for controlling the same.

BACKGROUND ART

In general, the electronic parking brake (EPB) system, in particular, the motor-driven caliper-type, MoC-type, EPB system, may generate a clamping force, which is necessary parking power, by a mechanical structure device inside the caliper by increasing the torque generated by the electric motor through a reducer.

The MoC-type EPS system may pressurize the brake disc, which is integrally rotated with the wheel, with the brake pad by driving the electric motor to pressurize the piston, generating clamping force by frictional force between the brake pad and the contact surface of the brake disc.

The MoC-type EPS system is applied mainly to passenger vehicles or some recreational vehicles (RVs).

To apply the MoC-type EPS system to a vehicle, the capacity of the electric motor, the gear ratio of the actuator, and durability life should be considered. Application to heavy-duty (HD) vehicles, such as buses or trucks, requires more clamping force, ending up leading to overdesign, and resultantly an increase in manufacturing costs.

DETAILED DESCRIPTION OF THE INVENTION

Technical Problem

An aspect of the disclosed invention provides an electronic parking brake system capable of generating clamping force necessary for parking regardless of the weight of the vehicle while preventing overdesign and a method for controlling the same.

Technical Solution

According to an aspect of the disclosed invention, there may be provided an electronic parking brake system, comprising a first electronic parking brake provided on a front wheel side of a vehicle to generate a first clamping force; a second electronic parking brake provided on a rear wheel side of the vehicle to generate a second clamping force; a gradient sensor detecting a gradient of the vehicle; and a controller determining a total clamping force required for parking based on a vehicle gradient and vehicle weight information, determining an electronic parking brake to operate among electronic parking brakes according to the determined total clamping force and operating the determined electronic parking brake.

The controller may determine the total clamping force required for parking as a higher value as the detected vehicle gradient increases and vehicle weight increases.

A first clamping force generated by the first electronic parking brake may be set to be lower than a second clamping force generated by the second electronic parking brake.

The controller may determine that the electronic parking brake to operate is the first electronic parking brake among the electronic parking brakes if the determined total clamping force is lower than the first clamping force.

The controller may determine that the electronic parking brake to operate is the second electronic parking brake among the electronic parking brakes if the determined total clamping force is higher than the first clamping force and lower than the second clamping force.

The controller may determine that the electronic parking brake to operate is the first electronic parking brake and the second electronic parking brake among the electronic parking brakes if the determined total clamping force is higher than the second clamping force.

The electronic parking brake may be a motor-on-caliper-type electronic parking brake.

According to another aspect of the disclosed invention, there may be provided an electronic parking brake system, comprising a first electronic parking brake provided on a front wheel side of a large vehicle to generate a first clamping force; a second electronic parking brake provided on a rear wheel side of the large vehicle to generate a second clamping force set to be higher than the first clamping force; a gradient sensor detecting a gradient of the large vehicle; and a controller operating the first electronic parking brake while stopping the second electronic parking brake if a weight of the large vehicle is in a first weight range in a case where the detected gradient when parking is applied is in a preset range, stopping the first electronic parking brake while operating the second electronic parking brake if the weight of the large vehicle is in a second weight range set to be higher than the first weight range, and operating both the first electronic parking brake and the second electronic parking brake if the weight of the large vehicle is in a third weight range set to be higher than the second weight.

The first weight range may be a curb weight range of the large vehicle, the second weight range may be a gross vehicle weight range of the large vehicle, and the third weight range may be a gross trailer weight rating range of the large vehicle.

According to another aspect of the disclosed invention, there may be provided a control method of an electronic parking brake system including a first electronic parking brake provided on a front wheel side of a vehicle to generate a first clamping force and a second electronic parking brake provided on a rear wheel side of the vehicle to generate a second clamping force, comprising detecting a gradient of the vehicle, determining a total clamping force required for parking based on the detected vehicle gradient and vehicle weight information, determining an electronic parking brake to operate among electronic parking brakes according to the determined total clamping force, and operating the determined electronic parking brake.

Determining the total clamping force may determine the total clamping force required for parking as a higher value as the detected vehicle gradient increases and vehicle weight increases.

A first clamping force generated by the first electronic parking brake may be set to be lower than a second clamping force generated by the second electronic parking brake.

Determining the electronic parking brake to operate may determine that the electronic parking brake to operate is the first electronic parking brake among the electronic parking brakes if the determined total clamping force is lower than the first clamping force.

Determining the electronic parking brake to operate may determine that the electronic parking brake to operate is the second electronic parking brake among the electronic parking brakes if the determined total clamping force is higher than the first clamping force and lower than the second clamping force.

Determining the electronic parking brake to operate may determine that the electronic parking brake to operate is the first electronic parking brake and the second electronic parking brake among the electronic parking brakes if the determined total clamping force is higher than the second clamping force.

Advantageous Effects

According to one aspect of the disclosed invention, it is possible to generate a clamping force required for parking regardless of vehicle weight while preventing overdesign.

According to another aspect of the disclosed invention, it is possible to appropriately control the clamping force required for parking of the front and rear wheels considering the vehicle's weight state and hill gradient.

MODE FOR CARRYING OUT THE INVENTION

Figure 1:
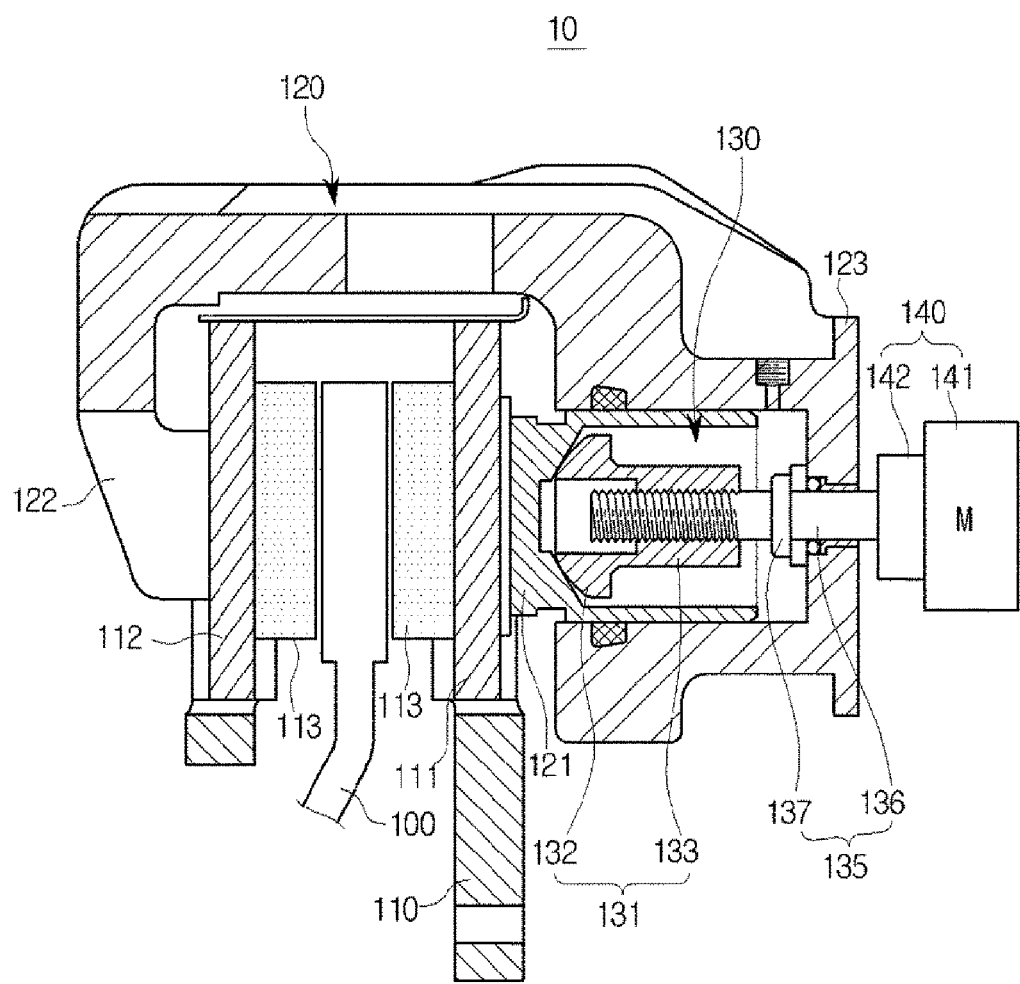
FIG. 1 illustrates a configuration of a motor-on-caliper (MoC)-type electronic parking brake (EPB) applied to an electronic parking brake system according to an embodiment.

The same reference numeral denotes the same element throughout the specification. This specification does not describe all elements of the embodiments, and general content in the technical field to which the disclosed invention pertains or content overlapping between the embodiments is omitted. The terms 'part, module, member, and block' used in the specification may be implemented in software or hardware, and it is also possible that a plurality of 'units, modules, members, and blocks' are implemented as one component, or one 'unit, module, member, or block' may include a plurality of components according to embodiments.

Throughout the specification, when an element is said to be "connected" with another, the connection may include direct connection and indirect connection. The indirect connection includes connection through a wireless communication network.

When an element "includes" another element, the element may further include the other element, rather excluding the other element, unless particularly stated otherwise.

Throughout the specification, when one member is positioned "on" another member, the first member may be positioned directly on the second member, or other member (s) may be positioned between the first and second member.

The terms "first" and "second" are used to distinguish one component from another, and the scope of the disclosure should not be limited thereby As used herein, the singular forms "a," "an," and "the" are intended to include the plural forms as well, unless the context clearly indicates otherwise.

The identifiers to designate the corresponding steps are used for convenience of description, but not limit the order of the steps. The steps may be performed in a different order from that specified therein, unless specified as limited thereto expressly in the context.

FIG. 1 illustrates a configuration of a motor-on-caliper (MoC)-type electronic parking brake (EPB) applied to an electronic parking brake system according to an embodiment.

Referring to FIG. 1, an electronic parking brake 10 may include a carrier 110 having a pair of pad plates 111 and 112 installed to advance and retreat to pressurize a brake disc 100 rotating along with the wheel of the vehicle, a caliper housing 120 having a cylinder 123 installed to be slidable on the carrier 110 and having a piston 121 installed to advance and retreat by brake hydraulic pressure, a power conversion unit 130 pressurizing the piston 121, and a motor actuator 140 transferring rotational force to the power conversion unit 130 using a motor M.

The pair of pad plates 111 and 112 are divided into an inner pad plate disposed to contact the piston 121 and an outer pad plate 112 disposed to contact a finger part 122 of the caliper housing 120. The pair of pad plates 111 and 112 are installed on the carrier 110 fixed to the vehicle body to be able to advance and retreat to/from two opposite sides of the brake disc 100. A brake pad 113 is attached to one surface of each pad plate 111 and 112 facing the brake disc 100.

The caliper housing 120 is installed to be slidable on the carrier 110. More specifically, the caliper housing 120 has the power conversion unit 130 installed at a rear part thereof and includes the cylinder 123 including the piston 121 to be able to advance and retreat and the finger part 122 formed to be bent downward to operate the outer pad plate 112 at a front part thereof. The finger part 122 and the cylinder 123 are integrally formed with each other.

The piston 121 is prepared in a cup-shaped hollow cylindrical shape and is inserted to be slidable in the cylinder 123. The piston 121 pressurizes the inner pad plate 111 to the brake disc 100 by the axial force of the power conversion unit 130 receiving the rotational force of the motor actuator 140. Accordingly, when the axial force of the power conversion unit 130 is applied, the piston 121 advances to the inner pad plate 111 to pressurize the inner pad plate 111 and, by the reaction force, the caliper housing 120 operates in the direction opposite from the piston 121 to allow the finger part 122 to pressurize the outer pad plate 112 to the brake disc 100, thereby performing brake.

The power conversion unit 130 plays a role to receive the rotational force from the motor actuator 140 and pressurize the piston 121 to the inner pad plate 111.

The power conversion unit 130 is installed to be placed in the piston 121 and may include a nut member 131 contacting the piston 121 and a spindle member 133 screwed to the nut member 131.

The nut member 131 is placed in the piston 121, with its rotation restricted, and may be screwed with the spindle member 135.

The nut member 131 may include a head 132 prepared to contact the piston 121 and a coupling part 133 extending from the head 132 and having a female thread on the inner circumferential surface to be screwed with the spindle member 135.

The nut member 131 may serve to pressurize and depressurize the piston 121 while advancing and retreating according to the rotation direction of the spindle member 135. In this case, the advancing direction may be a moving direction in which the nut member 131 approaches the piston 121. The retreating direction may be a moving direction in which the nut member 131 moves away from the piston 121. Besides, the advancing direction may be a moving direction in which the piston 121 approaches the brake pad 113. The retreating direction may be a moving direction in which the piston 121 moves away from the brake pad 113.

The spindle member 135 may include an axial part 136 passing through a rear portion of the caliper housing 120 and receiving the rotational force of the motor actuator 140 to rotate and a flange part 137 radially extending from the axial part 136. The axial part 131 has a first side installed to pass through the rear side of the cylinder 123 to be rotatable and a second side disposed in the piston 121. In this case, the first side of the axial part 131 passing through the cylinder 123 is connected with the output side of the reducer 142 to receive the rotational force of the motor actuator 140.

The motor actuator 140 may include an electric motor 141 and the reducer 142.

The electric motor 141 may rotate the spindle member 135 to advance or retreat the nut member 131 to thereby pressurize or depressurize the piston 121.

The reducer 142 may be prepared between the output side of the electric motor 141 and the spindle member 135.

By having the above-described configuration, the electronic parking brake 10 may rotate the spindle member 135 in one direction, by way of the motor actuator 140 in the parking apply mode, thereby moving the nut member 131 to pressurize the piston 121. Pressurized by the movement of the nut member 131, the piston 121 may pressurize the inner pad plate 111, bringing the brake pad 113 in tight contact with the brake disc 100 and hence generating clamping force.

Further, in the parking release mode, the electronic parking brake 10 may rotate the spindle member 135 in the opposite direction by way of the motor actuator 140, retreating the nut member 131 pressurized by the piston 121. As the nut member 131 retreats, the piston 121 may be depressurized. As the piston 121 is depressurized, the brake pad 113 comes apart from the brake disc 100, releasing the generated clamping force.

Figure 2:
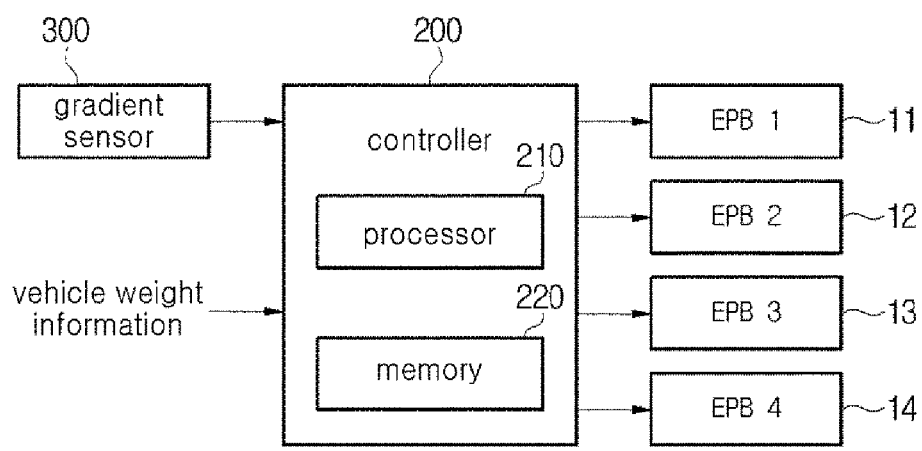
FIG. 2 illustrates control blocks of an electronic parking brake system according to an embodiment.
Figure 3:
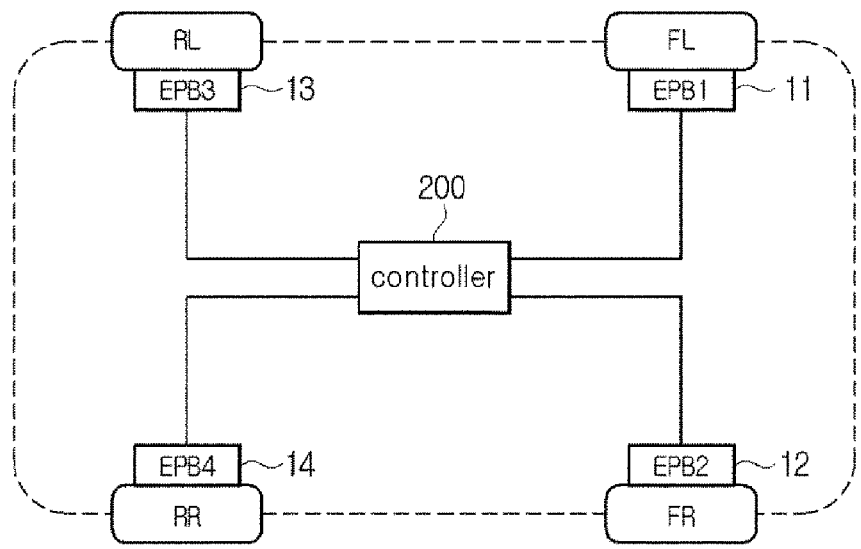
FIG. 3 illustrates a vehicle to which an electronic parking brake system is applied according to an embodiment.

FIG. 2 illustrates control blocks of an electronic parking brake system according to an embodiment. FIG. 3 illustrates a vehicle ton which an electronic parking brake system is applied according to an embodiment.

Referring to FIGS. 2 and 3, an electronic parking brake system may include a controller 200 that performs the overall control.

A gradient sensor 300 may be electrically connected to the input side of the controller 200.

A first electronic parking brake (first EPB) 11, a second electronic parking brake (second EPB) 12, a third electronic parking brake (third EPB) 13, and a fourth electronic parking brake (fourth EPB) 14 may be electrically connected to the output side of the controller 200.

The controller 200 may be referred to as an electronic control unit (ECU).

The controller 200 may include a processor 210 and a memory 220.

The memory 220 may store a program for processing or controlling the processor 210 and various data for operating the electronic parking brake system.

The memory 220 may include not only volatile memories, such as S-RAM and D-RAM, but also non-volatile memories, such as flash memory, read-only memory (ROM), and erasable programmable read-only memory (EPROM).

The processor 210 may control the overall operation of the electronic parking brake system.

The controller 200 having the above-described configuration may drive the electric motor of each EPB. The controller 200 may rotate forward or reverse the electric motor of each EPB through a motor driving circuit for driving the electric motor of each EPB.

The controller 200 may drive the electric motor 141 by the manipulation signal of a parking switch manipulated by the driver or the manipulation signal generated by a program related to the operation of the electronic parking brake.

The controller 200 may perform the parking apply mode or the parking release mode according to the manipulation signal of a parking switch manipulated by the driver or the manipulation signal generated by a program related to the operation of the electronic parking brake.

In the parking apply mode, the controller 200 may perform parking apply which rotates the electric motor of the corresponding EPB in one direction to move the nut member in the advancing direction and pressurize the piston, thereby bringing the brake pad in tight contact with the brake disc and hence generating clamping force.

In the parking release mode, the controller 200 may perform parking release which rotates the electric motor of the corresponding EPB in the opposite direction to move the nut member in the retreating direction and depressurize the piston, thereby releasing the tight contact of the brake pad to the brake disc and hence releasing the clamping force.

The gradient sensor 300 may detect the gradient of the inclined road where the vehicle is positioned. The gradient sensor 300 may include a G sensor for detecting the deceleration of the vehicle. The controller 200 may receive the gradient detected from the gradient sensor 300. It is also possible to receive the gradient of the vehicle from the outside, without the gradient sensor 300.

The first EPB 11 may be provided on the front left wheel FL. The first EPB 11 may generate a clamping force required for parking on the front left wheel FL according to a control signal of the controller 200. For example, the clamping force required for parking on the front left wheel FL may be determined from the road friction coefficient, the brake torque of the front left wheel FL braking torque, the gradient of the vehicle, the rolling radius, and the effective radius.

The second EPB 12 may be provided on the front right wheel FR. The second EPB 12 may generate a clamping force required for parking on the front right wheel FR according to a control signal of the controller 200. The clamping force required for parking on the front right wheel FR may be determined in the same manner as the clamping force required for parking on the front left wheel FL.

The third EPB 13 may be provided on the rear left wheel RL. The third EPB 13 may generate a clamping force required for parking on the rear left wheel RL according to a control signal of the controller 200.

The fourth EPB 14 may be provided on the rear right wheel RR. The fourth EPB 14 may generate a clamping force required for parking on the rear right wheel RR according to a control signal of the controller 200.

The clamping force required for parking on the rear left wheel RL and the clamping force required for parking on the rear right wheel RR may be determined in the same manner as the clamping force required for parking on the front left wheel FL.

The first EPB 11, the second EPB 12, the third EPB 13, and the fourth EPB 14 may be provided to generate different clamping forces.

The first EPB 11 and the second EPB 12 on the front wheel side FL and FR may be provided to generate a lower clamping force than the third EPB 13 and the fourth EPB 14 on the rear wheel side RL and RR.

A small electronic parking brake generating a relatively low clamping force may be applied to the first EPB 11 and the second EPB 12 on the front wheel side FL and FR.

A medium-sized electronic parking brake generating a relatively high clamping force may be applied to the third EPB 13 and the fourth EPB 14 on the rear wheel side RL and RR.

The controller 200 may transfer independent driving commands to the first EPB 11, the second EPB 12, the third EPB 13, and the fourth EPB 14 to independently control the first EPB 11 to the fourth EPB 14.

The controller 200 may receive vehicle weight information. Further, the controller 200 may estimate vehicle weight information based on various types of vehicle information.

The vehicle weight may be divided into several categories.

The vehicle weight may be divided into a curb weight (CW), a gross vehicle weight (GVW), and a gross trailer weight rating (GTWR). The vehicle weight may be divided into a light weight, a medium weight, and a large weight.

The curb weight may be the weight when only the driver rides the empty vehicle.

The curb weight may be the weight of the vehicle measured after filling the vehicle with fuel, lubricating oil and coolant up to its maximum capacity, including the driver's weight (e.g., 75 kg), with a spare tire and standard tools equipped.

The gross vehicle weight may be the weight that is the maximum load of the vehicle itself.

The gross vehicle weight may be the weight of the vehicle equipped with the riding capacity of passengers including the driver (e.g., 65 kg or 75 kg per person) and the maximum payload of accessories.

The gross trailer weight rating may be the weight of the vehicle plus the weight of the trailer.

The gross trailer weight rating may be the gross vehicle weight of the vehicle trailing a trailer. For example, the gross trailer weight rating may be the gross vehicle weight of the vehicle trailing a trailer loaded with the maximum payload.

An electronic parking brake (e.g., a small EPB) capable of generating clamping force corresponding to the curb weight may be applied to either the front wheels or rear wheels of the vehicle, and an electronic parking brake (e.g., a medium-sized EPB) capable of generating clamping force corresponding to the gross vehicle weight may be applied to the others.

Described below is a vehicle that adopts small electronic parking brakes capable of generating clamping force corresponding to the curb weight for the front wheels while adopting electronic parking brakes (e.g., medium-sized EPBs) capable of generating clamping force corresponding to the gross vehicle weight for the rear wheels.

The controller 200 may determine the total clamping force value required for parking based on the vehicle weight information and vehicle gradient. The total clamping force value may be determined to have a higher force value as the vehicle weight increases and the vehicle gradient increases.

The controller 200 may recognize the weight of the vehicle from input or estimated vehicle weight information. For example, the controller 200 may recognize which one of the curb weight (CW), the gross vehicle weight (GVW), or the gross trailer weight rating (GTWR) the vehicle weight is.

The controller 200 may determine the EPB to operate among the front wheel-side EPBs 11 and 12 and the rear wheel-side EPBs 13 and 14 based on the determined total clamping force value.

The controller 200 may output a driving command for driving the corresponding EPB to the corresponding EPB to operate the determined EPB.

Figure 4:
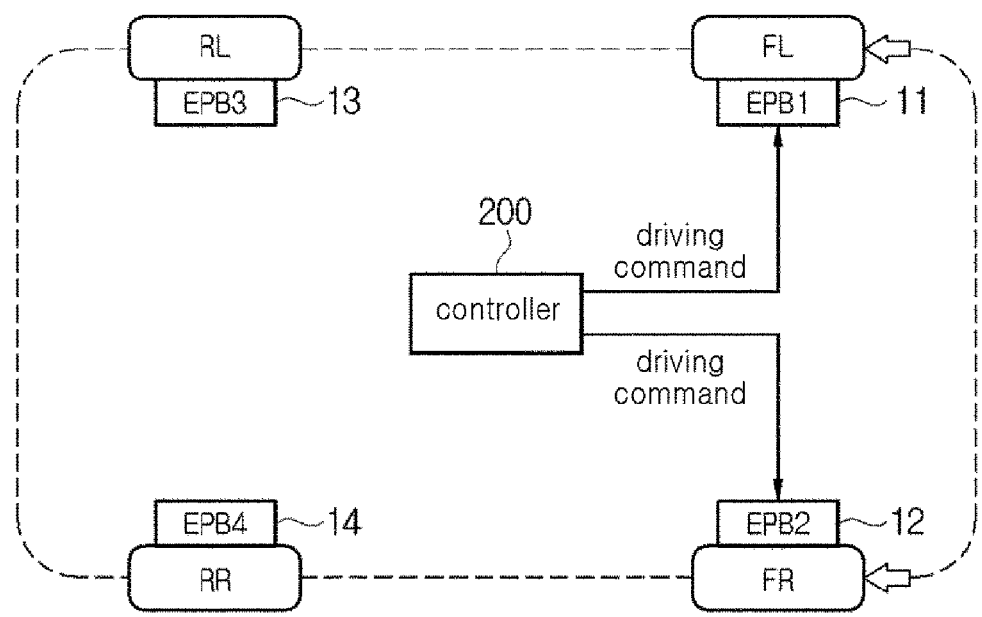
FIG. 4 illustrates generating a clamping force only at the front wheels of a vehicle to which an electronic parking brake system is applied according to an embodiment.

FIG. 4 illustrates generating a clamping force only at the front wheels of a vehicle to which an electronic parking brake system is applied according to an embodiment.

Referring to FIG. 4, if the total clamping force value determined based on the vehicle weight information and vehicle gradient is within a force value coverable by the clamping force that may be generated by the front wheel-side EPBs 11 and 12, the controller 200 may operate the front wheel-side EPBs 11 and 12 and stop the rear wheel-side EPBs 13 and 14.

For example, if the vehicle weight is not more than the curve weight (CW) of the large vehicle (HD vehicle), and the vehicle gradient is a preset value or less, the controller 200 may operate the front wheel-side EPBs 11 and 12 and stop the rear wheel-side EPBs 13 and 14.

In other words, the controller 200 may operate only the front wheel-side EPBs 11 and 12.

Accordingly, clamping forces required for parking as indicated by arrows may be generated only at the front left and right wheels FL and FR.

Figure 5:
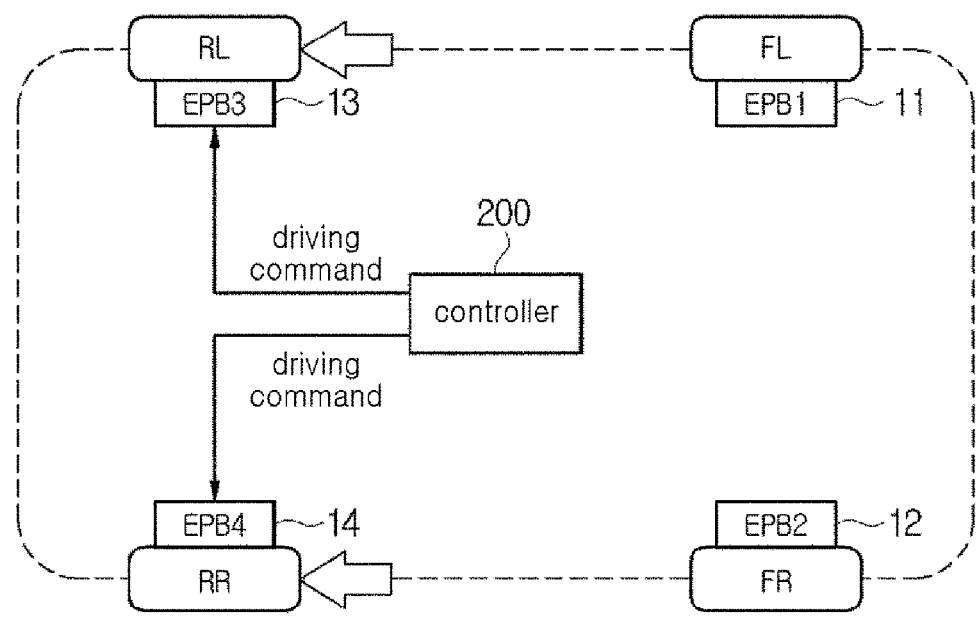
FIG. 5 illustrates generating a clamping force only at the rear wheels of a vehicle to which an electronic parking brake system is applied according to an embodiment.

FIG. 5 illustrates generating a clamping force only at the rear wheels of a vehicle to which an electronic parking brake system is applied according to an embodiment.

Referring to FIG. 5, if the total clamping force value determined based on the vehicle weight information and vehicle gradient is within a force value coverable by the clamping force that may be generated by the rear wheel-side EPBs 13 and 14, the controller 200 may stop the front wheel-side EPBs 11 and 12 and operate the rear wheel-side EPBs 13 and 14.

For example, if the vehicle weight is not more than the curb weight (CW) of the large vehicle (HD vehicle) and the vehicle gradient is more than the preset value, or if the vehicle weight is more than the curb weight (CW) of the large vehicle (HD vehicle) and not more than the gross vehicle weight (GVW) and the vehicle gradient is not more than the preset value, the controller 200 may stop the front wheel-side EPBs 11 and 12 and operate the rear wheel-side EPBs 13 and 14.

In other words, the controller 200 may operate only the rear wheel-side EPBs 13 and 14.

Accordingly, clamping forces as indicated by arrows may be generated only at the rear left and right wheels RL and RR.

Figure 6:
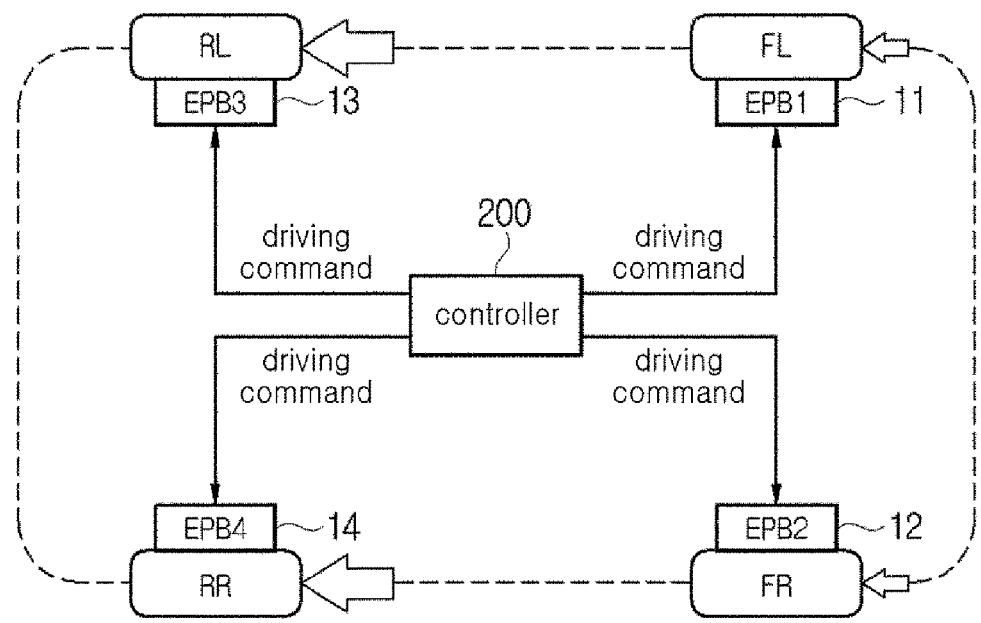
FIG. 6 illustrates generating a clamping force at both the front and rear wheels of a vehicle to which an electronic parking brake system is applied according to an embodiment.

FIG. 6 illustrates generating a clamping force at both the front and rear wheels of a vehicle to which an electronic parking brake system is applied according to an embodiment.

Referring to FIG. 6, if the total clamping force value determined based on the vehicle weight information and vehicle gradient is within a force value coverable by the clamping force that may be generated by the front wheel-side EPBs 11 and 12 and the rear wheel-side EPBs 13 and 14, the controller 200 may operate the front wheel-side EPBs 11 and 12 along with the rear wheel-side EPBs 13 and 14.

For example, if the vehicle weight is not more than the gross vehicle weight (GVW) of the large vehicle (HD vehicle) and the vehicle gradient is more than the preset value, or if the vehicle weight is more than the gross vehicle weight (GVW) of the large vehicle (HD vehicle), the controller 200 may operate the front wheel-side EPBs 11 and 12 along with the rear wheel-side EPBs 13 and 14.

In other words, the controller 200 may operate both the front wheel-side EPBs 11 and 12 and the rear wheel-side EPBs 13 and 14.

Accordingly, clamping forces indicated by the arrows may be generated at the front left and right wheels FL and FR while clamping forces indicated by the arrows may be generated at the rear left and right wheels RL and RR.

Meanwhile, if the vehicle gradient in the parking apply is within a preset range, and the weight of the large vehicle is within the curb weight (CW), the controller 200 may turn on (activate) the front wheel-side EPBs 11 and 12 while turning off (deactivate) the rear wheel-side EPBs 13 and 14.

Further, if the weight of the large vehicle is within the gross vehicle weight (GVW), the controller 200 may turn on the rear wheel-side EPBs 13 and 14 while turning off the front wheel-side EPBs 11 and 12.

Further, if the weight of the large vehicle is within the gross trailer weight rating (GTWR) range, the controller 200 may turn on the front wheel-side EPBs 11 and 12 while turning on the rear wheel-side EPBs 13 and 14.

As such, when the vehicle gradient is within a preset range, the controller 200 may operate only the small EPB if the vehicle weight is the curb weight (CW), operate only the medium-sized EPB if the vehicle weight is the gross vehicle weight (GVW), and operate all EPBs if the vehicle weight is the gross trailer weight rating (GTWR), separately generating the clamping force required for each vehicle weight and vehicle gradient.

Accordingly, the electronic parking brake system according to an embodiment may generate different clamping forces to the front wheels and the rear wheels and control the clamping force required for parking considering the vehicle gradient and the vehicle weight state, thus securing the durability required for commercial vehicles while preventing overdesign due to excessive durability life. Further, even when the EPB system fails or each EPB fails, the remaining EPBs may operate. Thus, it is possible to secure redundancy for the brake system.

Figure 7:
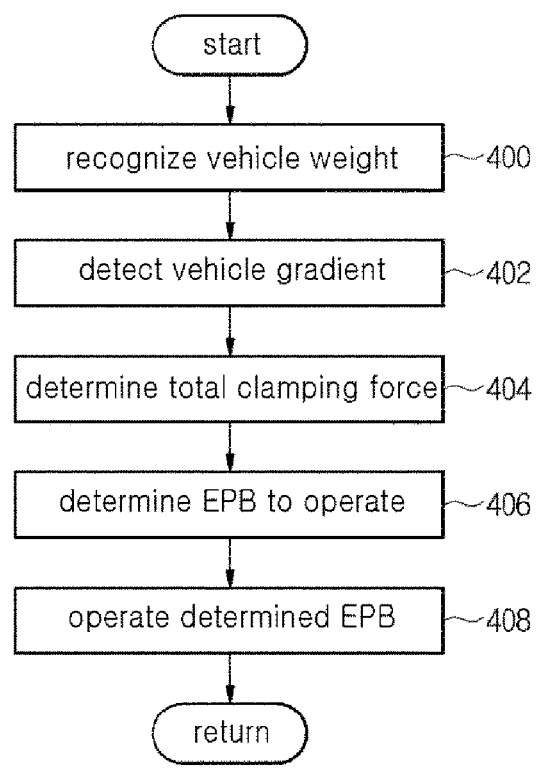
FIG. 7 illustrates a control method of an electronic parking brake system according to an embodiment.

FIG. 7 illustrates a control method of an electronic parking brake system according to an embodiment.

Referring to FIG. 7, first, the controller 200 may recognize the vehicle weight (400). The controller 200 may receive the vehicle weight information from the outside or estimate the vehicle weight information from the vehicle model, recognizing the weight of the vehicle according to the vehicle weight information.

The controller 200 may detect the vehicle gradient through the gradient sensor 300 (402).

The controller 200 may determine the total clamping force required for parking the vehicle based on the recognized vehicle weight and the detected vehicle gradient (404).

The controller 200 may determine the EPB to operate among all the EPBs (EPB 1 to EPB 4) according to the determined total clamping force (406).

After determining the EPB to operate, the controller 200 may operate the determined EPB (408).

Figure 8:
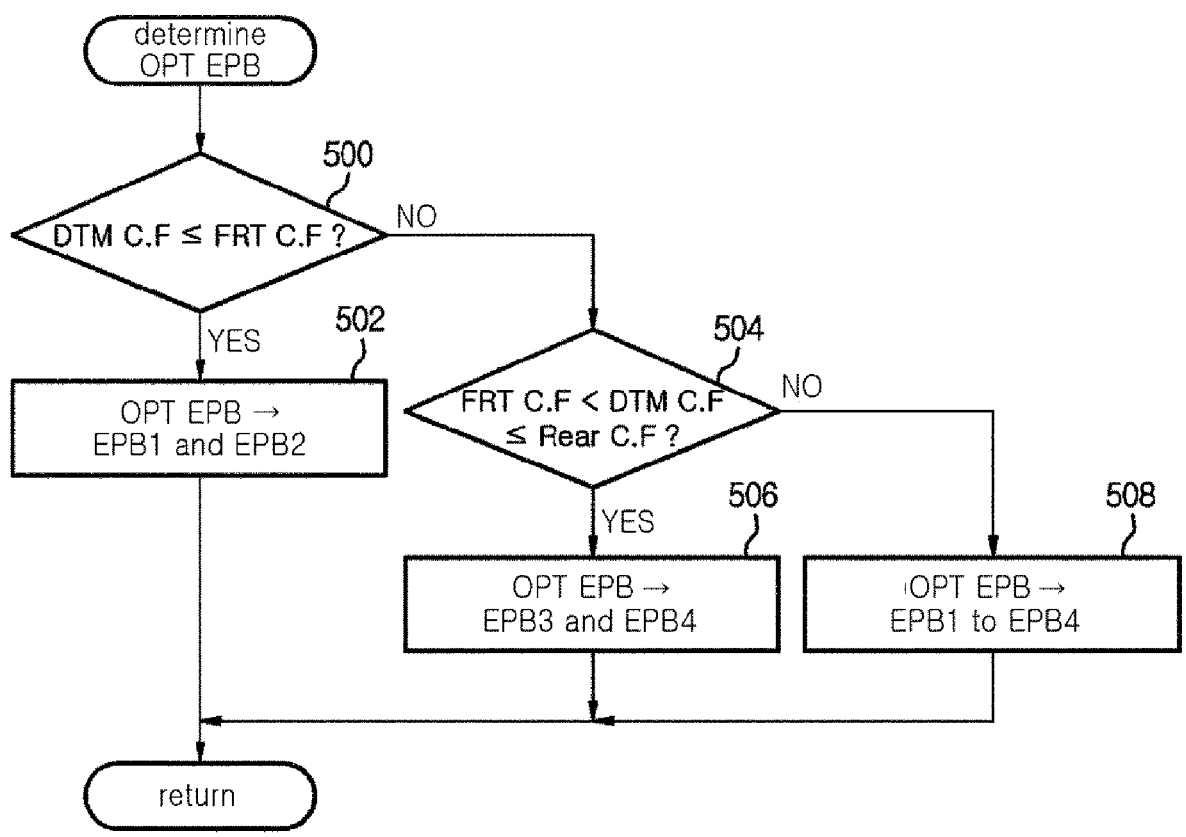
FIG. 8 illustrates a method for determining an EPB to be operated in an electronic parking brake system according to an embodiment.

FIG. 8 illustrates a method for determining an EPB to be operated in an electronic parking brake system according to an embodiment.

Referring to FIG. 8, the controller 200 may compare the determined total clamping force DTM C.F with the front wheel-side clamping force FRT C.F generatable by the front wheel-side EPBs 11 and 12, determining whether the determined total clamping force DTM C.F is not more than the front wheel-side clamping force FRT C.F (500). In this case, the front wheel-side clamping force FRT C.F may be the clamping force which is the sum of the front left wheel-side clamping force FL C.F generatable by the front left (FL)-side EPB 11 and the front right (FR)-side clamping force FR C.F generatable by the front right (FR)-side EPB 12.

If, as a result of determining the operation mode 500, the determined total clamping force DTM C.F is not more than the front wheel-side clamping force FRT C.F, the controller 200 may determine that the EPB to operate (OPT EPB) is the front wheel-side EPBs, i.e., EPB 1 11 and EPB 2 12, among all the EPBs (502).

Meanwhile, if as a result of determining the operation mode 500, the determined total clamping force DTM C.F is more than the front wheel-side clamping force FRT C.F, the controller 200 may determine whether the determined total clamping force DTM C.F is more than the front wheel-side clamping force FRT C.F and not more than the rear wheel-side clamping force Rear C.F (504). In this case, the rear wheel-side clamping force Rear C.F may be the clamping force which is the sum of the rear left wheel (RL)-side clamping force RL C.F generatable by the rear left (RL)-side EPB 13 and the rear right (RR)-side clamping force RR C.F generatable by the rear right (RR)-side EPB 14.

If, as a result of determining the operation mode 504, the determined total clamping force DTM C.F is more than the front wheel-side clamping force FRT C.F, and not more than the rear wheel-side clamping force Rear C.F, the controller 200 may determine that the EPB to operate (OPT EPB) is the rear wheel-side EPBs, i.e., EPB 3 13 and EPB 4 14, among all the EPBs (506).

On the other hand, If, as a result of determining the operation mode 504, the determined total clamping force DTM C.F is more than the rear wheel-side clamping force Rear C.F, the controller 200 may determine that the EPB to operate (OPT EPB) is all the EPBs 11 to 14 (508).

Figure 9:
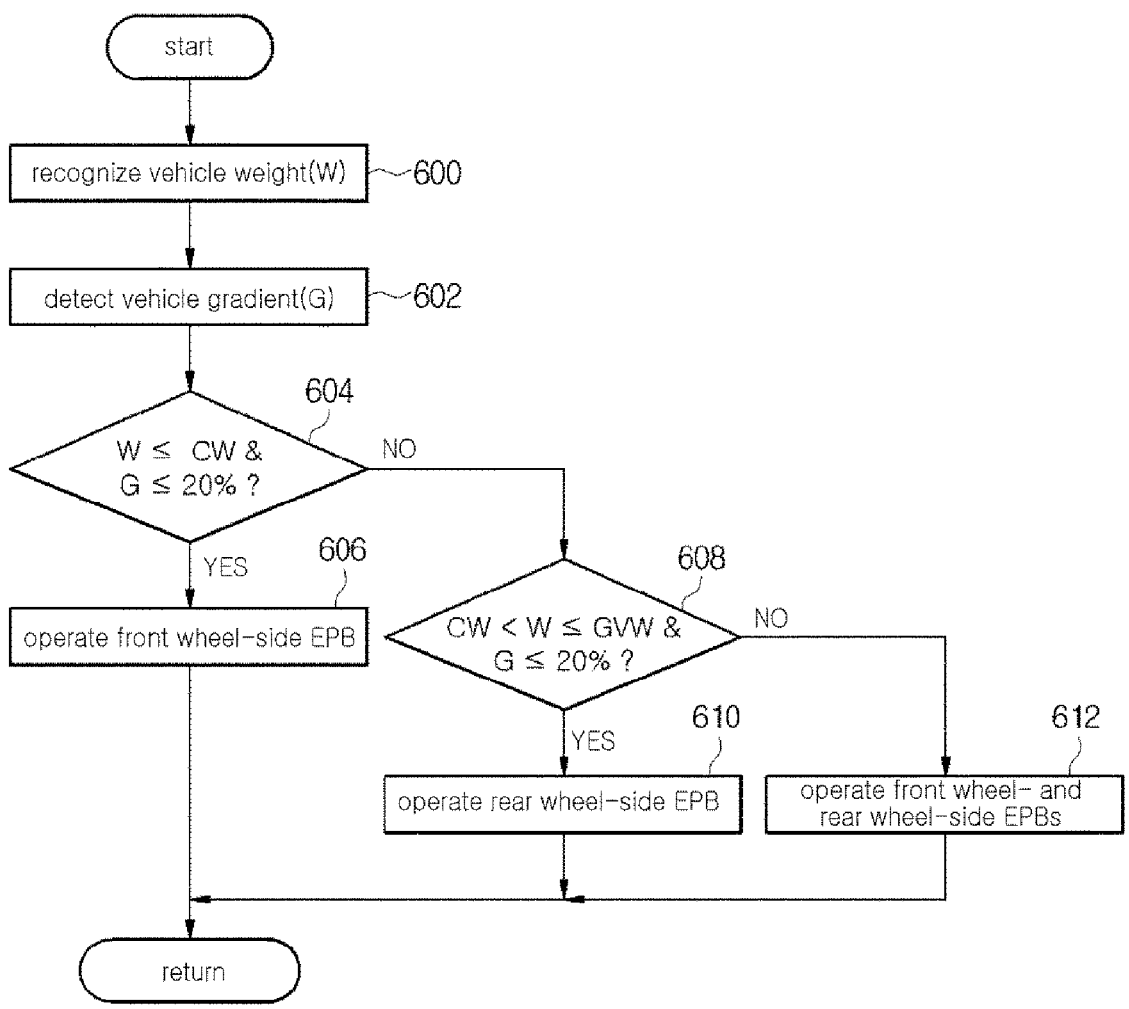
FIG. 9 illustrates a control method of an electronic parking brake system according to another embodiment.

FIG. 9 illustrates a control method of an electronic parking brake system according to another embodiment.

Referring to FIG. 9, first, the controller 200 may recognize the vehicle weight (600).

The controller 200 may detect the vehicle gradient through the gradient sensor 300 (602).

The controller 200 may determine whether the vehicle weight W is equal to or less than the curb weight (CW) and the vehicle gradient G is, e.g., 20% or less (604).

If, as a result of the determination of the operation mode 604, the vehicle weight (W) is less than or equal to the curb weight (CW) and the vehicle gradient (G) is, e.g., less than or equal to 20%, the controller 200 may operate only the front wheel-side EPBs 11 and 12 (606).

Meanwhile, if, as a result of the determination of the operation mode 604, the condition of 604 is not met, the controller 200 may determine whether the vehicle weight (W) exceeds the curb weight (CW), the vehicle weight (W) is less than or equal to the gross vehicle weight (GVW), and the vehicle gradient (G) is, e.g., 20% or less (608).

If, as a result of the determination of operation mode 608, the vehicle weight (W) exceeds the curb weight (CW), the vehicle weight (W) is less than or equal to the gross vehicle weight (GVW), and the vehicle gradient (G) is, e.g., 20% or less, the controller 200 may operate only the rear wheel-side EPBs 13 and 14 (610).

Meanwhile, if, as a result of the determination of operation mode 608, the condition of 608 is not met, the controller 200 may operate both the front wheel-side EPBs 11 and 12 and the rear wheel-side EPBs 13 and 14 (612).

As described above, the electronic parking brake system according to an embodiment may generate clamping force required for parking regardless of the vehicle weight while preventing overdesign and may properly control the clamping force required for parking on the front wheels and rear wheels based on the vehicle weight state and heel gradient.

The invention claimed is:

1. An electronic parking brake system, comprising:
a first electronic parking brake provided on a front wheel side of a vehicle to generate a first clamping force;
a second electronic parking brake provided on a rear wheel side of the vehicle to generate a second clamping force;
a gradient sensor detecting a gradient of the vehicle; and
a controller determining a total clamping force required for parking based on a vehicle gradient and vehicle weight information, determining an electronic parking brake to operate among the electronic parking brakes according to the determined total clamping force and operating the determined electronic parking brake,
wherein a first clamping force generated by the first electronic parking brake is set to be lower than a second clamping force generated by the second electronic parking brake,
wherein the controller selectively determines an electronic parking brake to operate as at least one of the first electronic parking brake and the second electronic parking brake based on a comparison of the determined total clamping force with at least one of the first clamping force and the second clamping force.

2. The electronic parking brake system of claim 1, wherein the controller determines the total clamping force required for parking as a higher value as the detected vehicle gradient increases and vehicle weight increases.

3. The electronic parking brake system of claim 1, wherein the controller determines that the electronic parking brake to operate is the first electronic parking brake among the electronic parking brakes if the determined total clamping force is lower than the first clamping force.

4. The electronic parking brake system of claim 1, wherein the controller determines that the electronic parking brake to operate is the second electronic parking brake among the electronic parking brakes if the determined total clamping force is higher than the first clamping force and lower than the second clamping force.

5. The electronic parking brake system of claim 1, wherein the controller determines that the electronic parking brake to operate is the first electronic parking brake and the second electronic parking brake among the electronic parking brakes if the determined total clamping force is higher than the second clamping force.

6. The electronic parking brake system of claim 1, wherein each of the electronic parking brakes is a motor-on-caliper-type electronic parking brake.

7. An electronic parking brake system, comprising:
a first electronic parking brake provided on a front wheel side of a large vehicle to generate a first clamping force;
a second electronic parking brake provided on a rear wheel side of the large vehicle to generate a second clamping force set to be higher than the first clamping force;
a gradient sensor detecting a gradient of the large vehicle; and
a controller operating the first electronic parking brake while stopping the second electronic parking brake if a weight of the large vehicle is in a first weight range in a case where the detected gradient when parking is applied is in a preset range,
stopping the first electronic parking brake while operating the second electronic parking brake if the weight of the large vehicle is in a second weight range set to be higher than the first weight range, and
operating both the first electronic parking brake and the second electronic parking brake if the weight of the large vehicle is in a third weight range set to be higher than the second weight.

8. The electronic parking brake system of claim 7, wherein the first weight range is a curb weight range of the large vehicle, the second weight range is a gross vehicle weight range of the large vehicle, and the third weight range is a gross trailer weight rating range of the large vehicle.

9. A control method of an electronic parking brake system including a first electronic parking brake provided on a front wheel side of a vehicle to generate a first clamping force and a second electronic parking brake provided on a rear wheel side of the vehicle to generate a second clamping force, the control method comprising:
detecting a gradient of the vehicle,
determining a total clamping force required for parking based on the detected vehicle gradient and vehicle weight information,
determining an electronic parking brake to operate among the electronic parking brakes according to the determined total clamping force, and
operating the determined electronic parking brake,
wherein a first clamping force generated by the first electronic parking brake is set to be lower than a second clamping force generated by the second electronic parking brake,
wherein the determining the electronic parking brake to operate comprises selectively determining the electronic parking brake to operate as at least one of the first electronic parking brake and the second electronic parking brake based on a comparison of the determined total clamping force with at least one of the first clamping force and the second clamping force.

10. The control method of claim 9, wherein determining the total clamping force determines the total clamping force required for parking as a higher value as the detected vehicle gradient increases and vehicle weight increases.

11. The control method of claim 9, wherein determining the electronic parking brake to operate determines that the electronic parking brake to operate is the first electronic parking brake among the electronic parking brakes if the determined total clamping force is lower than the first clamping force.

12. The control method of claim 9, wherein determining the electronic parking brake to operate determines that the electronic parking brake to operate is the second electronic parking brake among the electronic parking brakes if the determined total clamping force is higher than the first clamping force and lower than the second clamping force.

13. The control method of claim 9, wherein determining the electronic parking brake to operate determines that the electronic parking brake to operate is the first electronic parking brake and the second electronic parking brake among the electronic parking brakes if the determined total clamping force is higher than the second clamping force.

* * * * *